(12) United States Patent
Newstadt et al.

(10) Patent No.: US 9,384,492 B1
(45) Date of Patent: Jul. 5, 2016

(54) METHOD AND APPARATUS FOR MONITORING PRODUCT PURCHASING ACTIVITY ON A NETWORK

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 648 days.

(21) Appl. No.: 12/333,030

(22) Filed: Dec. 11, 2008

(51) Int. Cl.
*G06Q 30/02* (2012.01)
*G06Q 30/06* (2012.01)
*H04L 29/06* (2006.01)

(52) U.S. Cl.
CPC ........ *G06Q 30/0201* (2013.01); *G06Q 30/0601* (2013.01); *H04L 63/0245* (2013.01)

(58) Field of Classification Search
None
See application file for complete search history.

(56) References Cited

U.S. PATENT DOCUMENTS

| | | | |
|---|---|---|---|
| 6,466,970 B1 * | 10/2002 | Lee et al. | 709/217 |
| 7,039,607 B2 * | 5/2006 | Watarai et al. | 705/35 |
| 7,089,246 B1 * | 8/2006 | O'Laughlen | 726/4 |
| 7,254,548 B1 * | 8/2007 | Tannenbaum | 705/18 |
| 7,467,202 B2 * | 12/2008 | Savchuk | 709/224 |
| 7,720,723 B2 * | 5/2010 | Dicker et al. | 705/26.8 |
| 7,814,043 B2 * | 10/2010 | Uchino | |
| 7,870,039 B1 * | 1/2011 | Dom et al. | 705/26.41 |
| 7,909,246 B2 * | 3/2011 | Hogg et al. | 235/380 |
| 2001/0027420 A1 * | 10/2001 | Boublik et al. | 705/26 |
| 2002/0010709 A1 * | 1/2002 | Culbert et al. | 707/500 |
| 2003/0061111 A1 * | 3/2003 | Dutta et al. | 705/26 |
| 2005/0138426 A1 * | 6/2005 | Styslinger | 713/201 |
| 2006/0077979 A1 * | 4/2006 | Dubrovsky et al. | 370/394 |
| 2010/0060741 A1 * | 3/2010 | Allard et al. | 348/180 |
| 2010/0083095 A1 * | 4/2010 | Nikovski et al. | 715/234 |

FOREIGN PATENT DOCUMENTS

WO   WO 00/42544   * 7/2000  ............. G06F 17/60

* cited by examiner

*Primary Examiner* — Allen Chein
(74) *Attorney, Agent, or Firm* — Wilmer Cutler Pickering Hale and Dorr LLP

(57) ABSTRACT

Method and apparatus for monitoring product purchasing activity on a network are described. In some examples, processing of network traffic in a network is performed. Web content is extracted from the network traffic at a node in the network. A statistical analysis of the web content is performed to detect product purchasing activity. Product attributes associated with the product purchasing activity are extracted. The product attributes are stored in a log implemented in a memory on the network.

20 Claims, 3 Drawing Sheets

METHOD AND APPARATUS FOR MONITORING PRODUCT PURCHASING ACTIVITY ON A NETWORK

BACKGROUND OF THE INVENTION

1. Field of the Invention

The present invention relates generally to computer network traffic analysis. More particularly, the present invention relates to a method and apparatus for monitoring product purchasing activity on a network.

2. Description of the Related Art

Parental control applications exist to monitor content that a child accesses on the Internet via the World Wide Web (Web). The parental control applications are used to ensure that the content accessed by the child is appropriate. However, children have access to more than just electronic content via the Web. Children can search for an purchase various inappropriate products, such as weapons, drugs, alcohol, pornography, mature video games, and the like over the Web. In addition, children can overextend themselves or their parents, purchasing expensive electronics or excessive numbers of smaller items, such as ring tones. If a child uses a credit card for the purchase, a parent can monitor some purchase activity using credit card statements. However, credit card statements do not give parents any forewarning of the purchase activity, as such statements are typically only received once a month. Further, credit card statements do not show the products that a child is still looking for, but has not yet purchased. Credit card statements also fail to indicate whether a purchase from an otherwise innocuous retailer includes objectionable material or not. Finally, with the advent of online payment services, such as PAYPAL, the parent may not have access to monthly statements, and may not even know that a child has a means to purchase products on the Web.

Accordingly, there exists a need in the art for a method and apparatus for monitoring product purchasing activity on a network.

SUMMARY OF THE INVENTION

Aspects of the invention relate to processing network traffic in a network. In some embodiments, web content is extracted from the network traffic at a node in the network. A statistical analysis of the web content is performed to detect product purchasing activity. Product attributes associated with the product purchasing activity are extracted. The product attributes are stored in a log implemented in a memory on the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
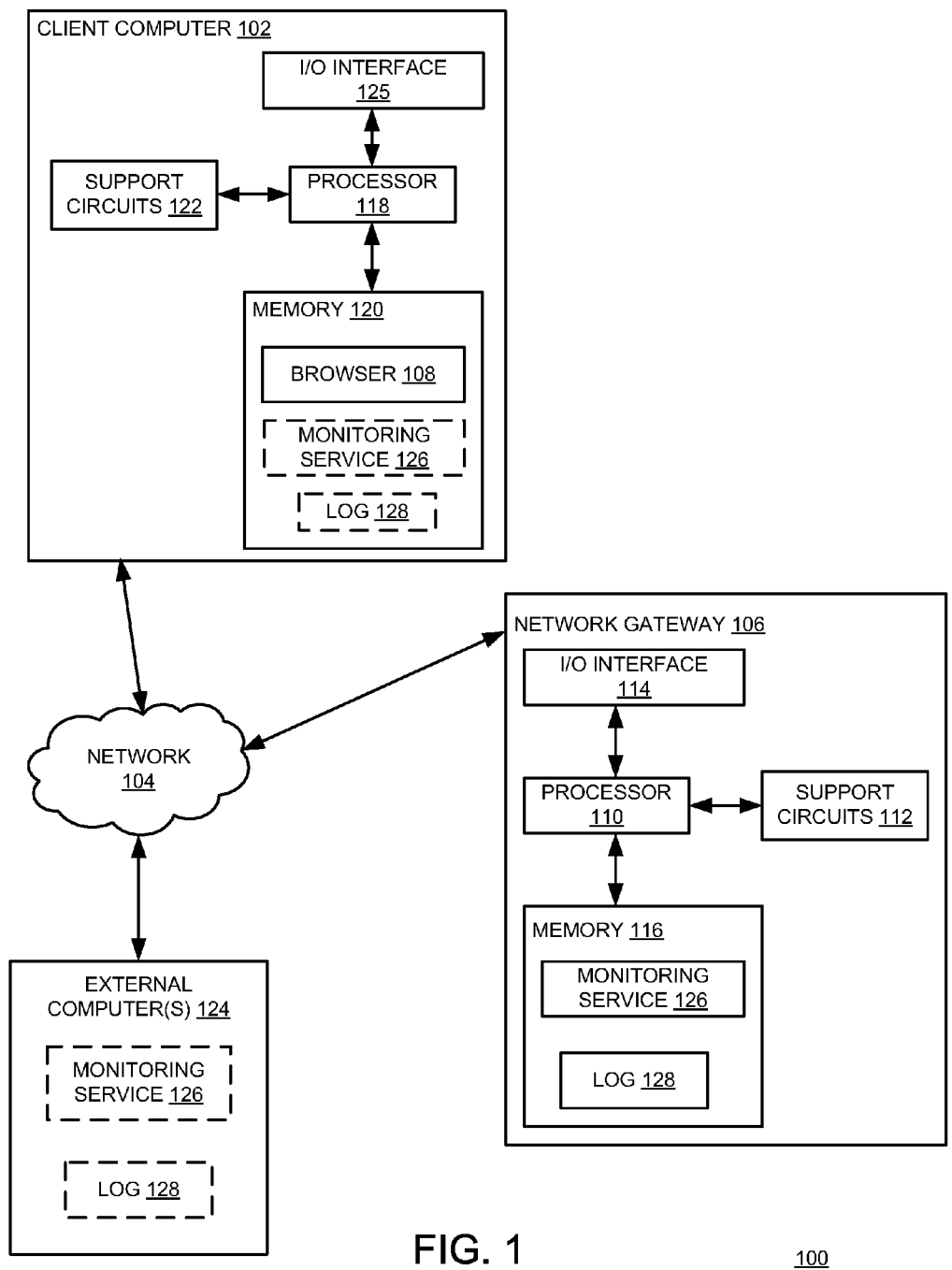
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes a client computer 102, a network 104, and a network gateway 106. The network 104 comprises a communication system that connects computer systems by wire, cable, fiber optic, and/or wireless links facilitated by various types of well-known network elements, such as hubs, switches, routers, and the like. In particular, the network 104 connects the client computer 102 and the gateway 106, as well as other external computers 124 (e.g., web servers on the Internet). The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN). Although only a single client computer 102 is shown for purposes of clarity by example, it is to be understood that the system 100 may include additional client computers coupled to the network gateway 106.

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

The client computer 102 includes a browser 108. The browser 108 may comprise software executable by the client computer 102 to browse the World Wide Web (WWW) (the browser may also be referred to as an "Internet Browser"). Exemplary browsers include MICROSOFT INTERNET EXPLORER, MOZILLA FIREFOX, and APPLE SAFARI. The browser 108 is configured to communicate with various web servers (e.g., external computers 124) using various application protocols, such as hypertext transfer protocol (HTTP), secure HTTP (HTTPS), and the like. Notably, the browser 108 may be employed to interact with various web pages. The web pages are transferred over the network 104 between the client computer 102 and web servers (e.g., external computers 124) in the network traffic. Web pages may include hypertext markup language (HTML), extensible markup language (XML), JAVASCRIPT, JAVASCRIPT Object Notation (JSON), asynchronous JAVASCRIPT and XML (AJAX), or the like, as well as combinations of such formats.

The network gateway 106 is configured to provide an interface between the client computer 102 and various other computers on the network 104 (e.g., external computers 124). The network gateway 106 illustratively includes a processor 110, a memory 116, various support circuits 112, an I/O interface 114. The processor 110 may include one or more microprocessors known in the art. The support circuits 112 for the processor 110 include conventional cache, power supplies, clock circuits, data registers, I/O interfaces, and the like. The I/O interface 114 may be configured for communication with the network 104. The memory 116 may include one or more of the following random access memory, read only memory, magneto-resistive read/write memory, optical read/write memory, cache memory, magnetic read/write memory, and the like.

The system 100 includes a monitoring service 126. The monitoring service 126 is configured to monitor product purchase activity initiated by the client computer 102. In some embodiments, the monitoring service 126 is implemented by the client computer 102. For example, the monitoring service 126 may be implemented as a plug-in to the browser 108 (e.g., a browser helper object (BHO)) or as separate software configured for execution by the processor 118. In some embodiments, the monitoring service 126 is implemented by the network gateway 106. For example, the monitoring service 126 may be implemented by configuring the network gateway 106 as a local proxy for the client computer 102. The browser 108 is configured to route traffic through the local proxy. In some embodiments, the monitoring service 126 may be implemented by another computer on the network 104 (e.g., an external computer 124) through a network proxy.

In general, the monitoring service 126 is implemented on a node in the network 104, which may be the client computer 102, the network gateway 106, or some other computer coupled to the network 104. In some embodiments, the monitoring service 126 comprises software configured for execution by a processor on the respective node to cause the node to process network traffic. While the monitoring service 126 is described as being software executed by a computer, it is to be understood that the monitoring service 126 may be implemented using hardware (e.g., via an application specific integrated circuit (ASIC) or programmable logic device (PLD), or a combination of hardware and software.

Figure 2:
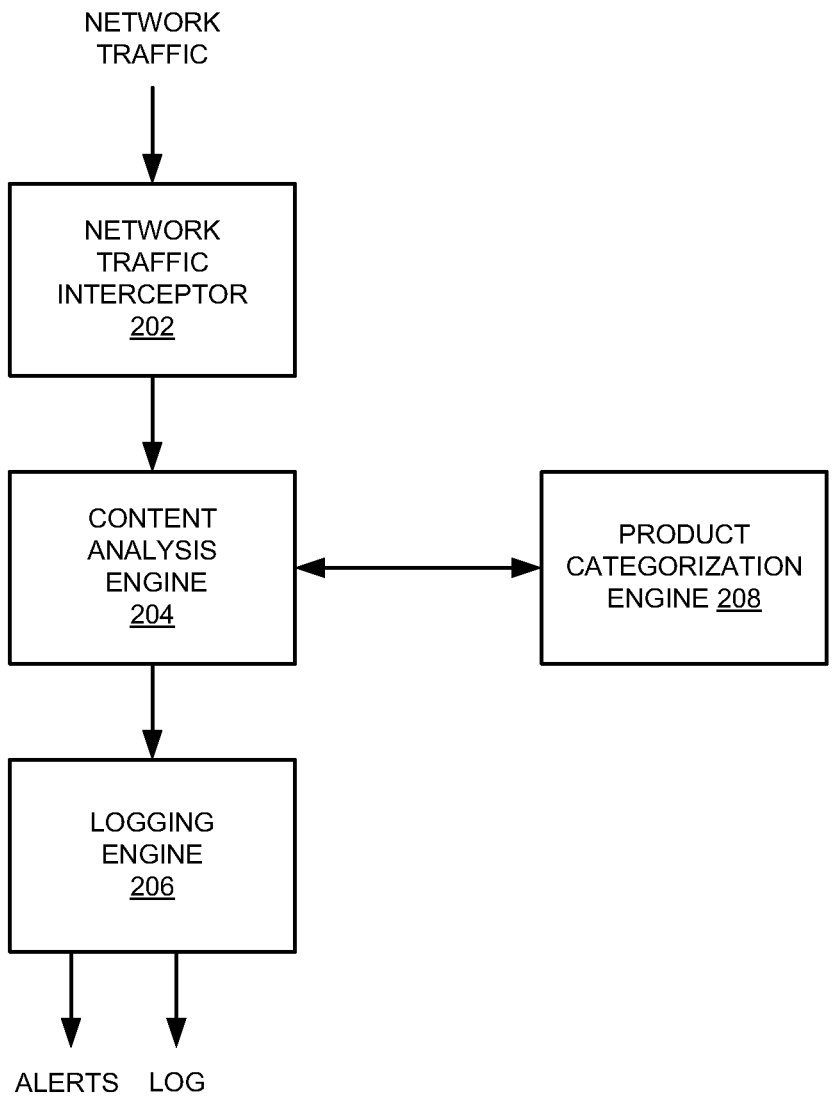
FIG. 2 is a block diagram depicting the monitoring service according to some embodiments of the invention.

FIG. 2 is a block diagram depicting the monitoring service 126 according to some embodiments of the invention. The monitoring service 126 includes a network traffic interceptor 202, a content analysis engine 204, and a logging engine 206. In some embodiments, the monitoring service 126 further includes a product categorization engine 208. The network traffic interceptor 202 is configured to intercept network traffic traversing the network 104 to and from the client computer 102. In some embodiments, the network traffic interceptor 202 is configured to intercept a particular subset of network traffic, such as traffic on a particular TCP port or ports (e.g., port 80 for HTTP traffic). In some embodiments, the network traffic interceptor 202 may intercept the network traffic at network traffic level (e.g., TCP/IP level). In some embodiments, the network traffic interceptor 202 may intercept the network traffic at a higher level than the network level, such as at a document object model (DOM) level or the like.

The content analysis engine 204 is configured to extract web content from the network traffic. The web content may include HTML, script, ADOBE FLASH, or like type web content known in the art. The content analysis engine 204 is further configured to analyze the web content to detect product purchasing activity. In some embodiments, the content analysis engine 204 performs a statistical analysis of the web content and applies heuristics to detect the product purchasing activity. For example, the content analysis engine 204 may search the web content for web pages that conform to at least one of a product search page template, a product description page template, or a purchase invoice page template. The product search page template may be used to identify product search pages (e.g., pages returned as part of a product search performed by a user). The product description page template can be used to identify product description pages (e.g., pages returned as part of a request for product information by a user). The purchase invoice page template can be used to identify purchase invoice pages (e.g., pages returned as a result of purchasing a product). The content analysis engine 204 may be configured to search for pages matching other types of templates related to product purchasing activity.

Each of the templates used by the content analysis engine 204 may set forth various criteria that can be used to determine if a particular web page is a match. Some criteria may be mandatory (i.e., the web page must satisfy the criteria), whereas other criteria may be optional (i.e., the web page can, but need not, satisfy the criteria). A web page may be deemed to conform to a template if all or a portion of the criteria are met, including at least the mandatory criteria.

For example, the product search page template may be defined as follows:
  Each item in a search result page must include a price.
  Each item in search result page may include a thumb nail image.
  Search and sorting terms on the search result page may include price, manufacturer, availability, and the like.
  Each item must include a link to a web page that can be identified as a product description page.

The product description page template may be defined as follows:
  The page must show a price.
  The page may contain a thumb nail image.
  The page may contain labels, such as manufacturer, dimensions, whether the product is in stock, and the like.
  The page may have been navigated to from a previously identified product search page.
  The page may include search terms used in a previously identified product search (not necessarily the same search that led to this page).

The purchase invoice page template may be defined as follows:
  The page must include an HTML table.
  The HTML table may include headers, such as product, description, price, quantity, and like type product attributes.
  The HTML table may include items previously identified in previously identified product description pages.
  The HTML table may include search terms used in previously identified product search pages.
  Pages recently navigated to prior to the present page requested information from the user, such as address, credit card number, PAYPAL account, and the like.

Those skilled in the art will appreciate that other criteria may be used in place of or in addition to that described above for the exemplary templates. The goal is to correctly identify product search pages, product description pages, purchase invoice pages, and the like with a particular degree of probability. The more mandatory criteria in the template, the more probable it is that a page will be correctly identified.

The content analysis engine 204 is further configured to extract product attributes associated with detected product purchasing activity. Various product attributes may be identified, some of which have been described above with respect to the criteria for the templates. For example, product attributes may include at least one of a product description, a product price, a product quantity, a uniform resource locator (URL) of a product description page, product search terms gleaned from a product search page, or the like. The product attributes may be associated with one or more products search for and/or purchased by a user on the client computer 102.

In some embodiments, the content analysis engine 204 may cooperate with the product categorization engine 208. In particular, the content analysis engine 204 may provide the product attributes to the product categorization engine 208. The product categorization engine 208 then analyzes the product attributes in an attempt to categorize the associated products. The product categorization engine 208 search for various categories, such as product type categories (e.g., weapons, drugs, games, pornography, etc.), product price categories (e.g., over $100, etc.), and the like. The product categorization engine 208 adds a category to each product to the product attributes (to the extent a product can be categorized). Any un-categorized products may be designated as such.

The content analysis engine 204 provides the product attributes to the logging engine 206. The logging engine 206 is configured to store the product attributes in a log 128. The log 128 may be implemented in a memory on the network, such as the memory 120 in the client computer 102, the memory 116 in the network gateway 106, or a memory of another node or computer on the network 104. Notably, the log 128 may be stored remote from the node that implements the monitoring service 126, or may be stored at such node. The log 128 may then be analyzed to inspect product purchase activity by the client computer 102. For example, a parent or administrator can inspect product purchase activity by a child or other minor that uses the client computer 102.

In some embodiments, the logging engine 206 is further configured to send an alert over the network in response to particular product attributes designated as requiring an alert. For example, if the product attributes indicate a product having a category of "weapons", the logging engine 206 may send an alert including the product attributes. In some embodiments, the alert may be a message, such as an e-mail message, sent to a particular network address (e-mail address). For example, a parent or administrator may register his or her e-mail address with the monitoring service 126, and the logging engine 206 may send any alerts to such e-mail address. A parent or administrator may further configure which product attributes are to trigger an alert.

Figure 3:
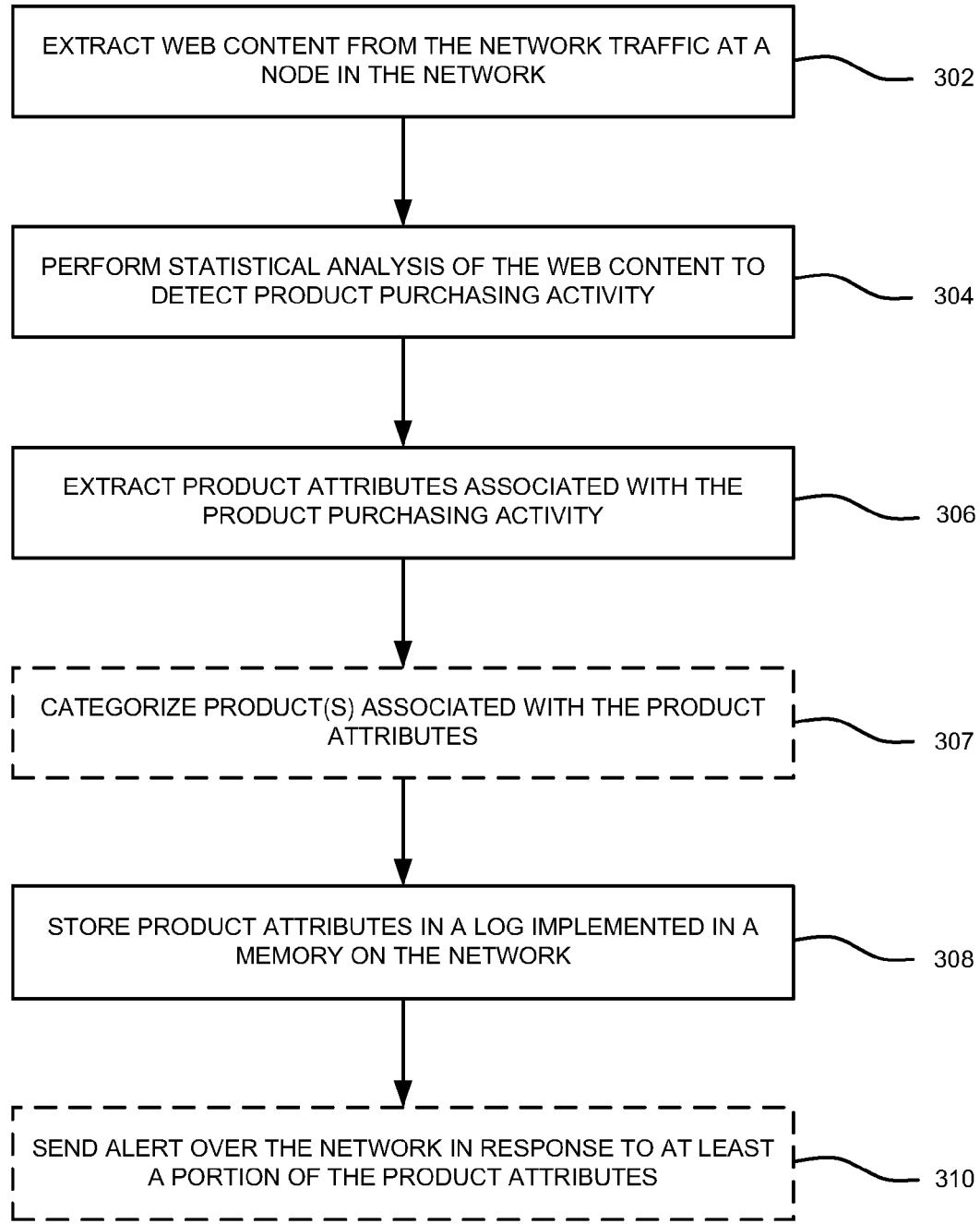
FIG. 3 is a flow diagram depicting a method of processing network traffic in a network according to some embodiments of the invention.

FIG. 3 is a flow diagram depicting a method 300 of processing network traffic in a network according to some embodiments of the invention. The method 300 begins at step 302, where web content is extracted from the network traffic at a node in the network. At step 304, a statistical analysis of the web content is performed to detect product purchasing activity. Exemplary statistical analyses are described above with respect to the content analysis engine 204. At step 306, product attributes associated with the product purchasing activity are extracted. At optional step 307, product(s) associated with the product attributes are categorized. At step 308, the product attributes are stored in a log implemented in a memory on the network. At optional step 310, an alert is sent over the network in response to at least a portion of the product attributes.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method of processing network traffic in a network, comprising:

extracting web content from the network traffic to and from a client computer at a node in the network, wherein extracting web content comprises at least one of intercepting the network traffic using a web browser plug-in module implemented by the node and intercepting the network traffic by configuring the node as a proxy;

performing a statistical analysis of the web content to detect product purchasing activity by a user of the client computer, wherein the step of performing the statistical analysis comprises searching the web content for web pages that conform to at least one template that comprises at least one mandatory criteria and at least one optional criteria, wherein the at least one template is used to identify web pages that meet the at least one mandatory criteria and the at least one optional criteria prior to detecting any product purchasing activity associated therewith, wherein the at least one template comprises a product description page template that comprises criteria requiring web pages that comprise a product price and web pages that have been navigated to from a previously identified product search or that comprise search terms used in a previously identified product search;

extracting product attributes associated with the product purchasing activity, wherein the product attributes are associated with one or more products searched for or purchased by the user of the client computer;

categorizing the web content associated with the product attributes, wherein the product attributes are analyzed to categorize the one or more products associated with the product attributes;

storing the product attributes in a log implemented in a memory on the network, wherein the log is configured to allow inspection of the product purchasing activity; and sending an alert over the network in response to at least a portion of the product attributes in the log, wherein the at least a portion of the product attributes are designated as requiring an alert.

2. The method of claim 1, wherein the step of extracting comprises:

processing the network traffic at a document object model (DOM) level or network traffic level using the web browser plug-in module.

3. The method of claim 1, wherein the step of extracting comprises:

processing the network traffic at a document object model (DOM) level or network traffic level using the proxy.

4. The method of claim 1, wherein the at least one template further comprises at least one of a product search page template or a purchase invoice page template.

5. The method of claim 4, wherein the product search page template includes at least one mandatory criteria and at least one optional criteria, the at least one mandatory criteria including a product price.

6. The method of claim 4, wherein the product description page template includes at least one mandatory criteria and at least one optional criteria, the at least one mandatory criteria including a product price.

7. The method of claim 4, wherein the purchase invoice page template includes at least one mandatory criteria and at least one optional criteria, the at least one mandatory criteria including a web table categorizing attributes of at least one product.

8. The method of claim 1, wherein the product attributes comprise at least one of product description, product price, product quantity, uniform resource locator (URL), or product search term attributes.

9. The method of claim 1, wherein the product attributes are associated with at least one product, and wherein the product attributes include a product category for the at least one product.

10. The method of claim 1, wherein the alert is configured to be triggered by user-selected product attributes.

11. A system for processing network traffic in a network comprising:
at least one processor configured to:
extract web content from the network traffic to and from a client computer at a node in the network, wherein web is extracted by at least one of intercepting the network traffic using a web browser plug-in module implemented by the node and intercepting the network traffic by configuring the node as a proxy;
perform a statistical analysis of the web content to detect product purchasing activity by a user of the client computer by searching the web content for web pages that conform with at least one template that comprises at least one mandatory criteria and at least one optional criteria, wherein the at least one template is used to identify web pages that meet the at least one mandatory criteria and the at least one optional criteria prior to detecting any product purchasing activity associated therewith, wherein the at least one template comprises a product description page template that comprises criteria requiring web pages that comprise a product price and web pages that have been navigated to from a previously identified product search or that comprise search terms used in a previously identified product search;
extract product attributes associated with the product purchasing activity, wherein the product attributes are associated with one or more products searched for or purchased by the user of the client computer;
categorize the web content associated with the product attributes, wherein the product attributes are analyzed to categorize the one or more products associated with the product attributes;
store the product attributes in a log implemented in a memory on the network, wherein the log is configured to allow inspection of the product purchasing activity; and
send an alert over the network in response to at least a portion of the product attributes in the log, wherein the at least a portion of the product attributes are designated as requiring an alert; and
at least one memory, coupled to the at least one processor, configured to provide the at least one processor with instructions.

12. The system of claim 11, wherein at least one processor is further configured to:
process the network traffic at a document object model (DOM) level or network traffic level using the web browser plug-in module.

13. The system of claim 11, wherein the at least one processor is further configured to:
process the network traffic at a document object model (DOM) level or network traffic level using the proxy.

14. The system of claim 11, wherein the at least one template further comprises at least one of a product search page template or a purchase invoice page template.

15. The system of claim 11, wherein the product attributes comprise at least one of product description, product price, product quantity, uniform resource locator (URL), or product search term attributes.

16. The system of claim 11, wherein the product attributes are associated with at least one product, and wherein the product attributes include a product category for the at least one product.

17. The system of claim 11, wherein the alert is configured to be triggered by user-selected product attributes.

18. At least one non-transitory computer readable storage medium having instructions stored thereon that when executed by a processor cause the processor to:
extract web content from the network traffic to and from a client computer at a node in the network, wherein web is extracted by at least one of intercepting the network traffic using a web browser plug-in module implemented by the node and intercepting the network traffic by configuring the node as a proxy;
perform a statistical analysis of the web content to detect product purchasing activity by a user of the client computer by searching the web content for web pages that conform with at least one template that comprises at least one mandatory criteria and at least one optional criteria, wherein the at least one template is used to identify web pages that meet the at least one mandatory criteria and the at least one optional criteria prior to detecting any product purchasing activity associated therewith, wherein the at least one template comprises a product description page template that comprises criteria requiring web pages that comprise a product price and web pages that have been navigated to from a previously identified product search or that comprise search terms used in a previously identified product search;
extract product attributes associated with the product purchasing activity, wherein the product attributes are associated with one or more products searched for or purchased by the user of the client computer;
categorize the web content associated with the product attributes, wherein the product attributes are analyzed to categorize the one or more products associated with the product attributes;
store the product attributes in a log implemented in a memory on the network, wherein the log is configured to allow inspection of the product purchasing; and
send an alert over the network in response to at least a portion of the product attributes in the log, wherein the at least a portion of the product attributes are designated as requiring an alert.

19. The at least one computer readable storage medium of claim 18, wherein the product attributes are associated with at least one product, and wherein the product attributes include a product category for the at least one product.

20. The at least one computer readable storage medium of claim 18, wherein the alert is configured to be triggered by user-selected product attributes.

* * * * *